United States Patent
Murray et al.

(10) Patent No.: US 9,593,173 B2
(45) Date of Patent: Mar. 14, 2017

(54) LOW TEMPERATURE CURE POLYMERIZATION INITIATOR

(71) Applicant: ELANTAS PDG, INC., St. Louis, MO (US)

(72) Inventors: Thomas James Murray, Chesterfield, MO (US); Heta S. Raval, St. Louis, MO (US)

(73) Assignee: ELANTAS PDG, Inc., St. Louis, MO (US)

( * ) Notice: Subject to any disclaimer, the term of this patent is extended or adjusted under 35 U.S.C. 154(b) by 435 days.

(21) Appl. No.: 14/194,053

(22) Filed: Feb. 28, 2014

(65) Prior Publication Data

US 2015/0246979 A1    Sep. 3, 2015

(51) Int. Cl.

| | |
|---|---|
| C08F 4/76 | (2006.01) |
| C08F 290/00 | (2006.01) |
| C08K 5/00 | (2006.01) |
| C08F 283/01 | (2006.01) |

(52) U.S. Cl.
CPC .............. *C08F 4/76* (2013.01); *C08F 283/01* (2013.01); *C08F 290/00* (2013.01); *C08K 5/0025* (2013.01)

(58) Field of Classification Search
CPC ........ C08F 4/76; C08F 283/01; C08F 290/00; C08K 5/0025; C08J 3/243
See application file for complete search history.

(56) References Cited

U.S. PATENT DOCUMENTS

| | | | |
|---|---|---|---|
| 5,236,976 A | 8/1993 | Michaels | |
| 6,692,802 B1 | 2/2004 | Nava | |
| 2010/0222520 A1* | 9/2010 | Tamai | C08F 8/14 525/329.5 |

OTHER PUBLICATIONS

N. Davidenko, et al., "The efficiency of titanocene as photoinitiator in the polymerization of dental formulations", J. Biomater Sci. Polymer Edn., 2003, vol. 14, No. 7, pp. 733-746.

Andreas Gansauer, et al., "Epoxides in Titanocene-Mediated and -Catalyzed Radical Reactions", Encyclopedia of Radicals in Chemistry, 2012, Biology and Materials, John Wiley & Sons, Ltd.

Miguel Paradas, et al., "Understanding the Exceptional Hydrogen-Atom Donor Characteristics of Water in $TI^{III}$-Mediated Free-Radical Chemistry", J. Am. Chem. Soc., 2010, vol. 132, pp. 12748-12756.

Alexandru D. Asandei, et al., "$TiCP_2Cl$-Catalyzed Living Radical Polymerization of Styrene Initiated by Oxirane Radical Ring Opening", J. Am. Chem. Soc., 2004, vol. 126, pp. 15932-15933.

Miguel Paradas, et al., "Unexpected $Ti^{III}/Mn$-Promoted Pinacol Coupling of Ketones", J. Org. Chem., 2009, vol. 74, pp. 3616-3619.

Alexandru D. Asandei, et al., "Living Ring-Opening Polymerization of Cyclic Esters with Epoxide-Derived Titanium Alkoxides", Macromol. Rapid Commun., 2005, vol. 2, pp. 626-631.

Mohamad-Ali Tehfe, et al., "On the Use of Bis(cyclopentadienyl)titanium(IV) Dichloride in Visible-Light-Induced Ring-Opening Photopolymerization", Macromolecules, American Chemical Society, 2012, vol. 45, pp. 356-361.

Alexandru D. Asandei, et al., "$Cp_2TiCl$-Catalyzed SET Reduction of Aldehydes: A New Initiating Protocol for Living Radical Polymerization", Macromolecules, American Chemical Society, 2006, vol. 39, pp. 7549-7554.

Bianca Rossi, et al., "New Advances in Titanium-Mediated Free Radical Reactions", Molecules, 2012, vol. 17, pp. 14700-14732.

Chryssostomos, Chatgilialoglu, "Organosilanes as Radical-Based Reducing Agents in Synthesis", Acc. Chem. Res., 1992, vol. 25, pp. 188-194, American Chemical Society.

Kyoji Kaeriyama, et al., "Photopolymerization with the Use of Titanocene Dichloride (sic) as Sensitizer", Journal of Polymer Science, 1972, vol. 10, pp. 2833-2840, John Wiley & Sons, Inc.

M. Ballestri, et al., "Tris(trimethylsilyl)silane as a Radical-Based Reducing Agent in Synthesis[1,2]", J. Org. Chem., 1991, vol. 56, pp. 678-683, American Chemical Society.

Xiao-hui Liu, et al., "Synthesis of hyperbranched polymers via a facile self-condensing vinyl polymerization system—Glycidyl methacrylate/$Cp_2TiCl_2$/Zn", Polymer, 2010, vol. 51, pp. 2857-2863, Elsevier.

\* cited by examiner

*Primary Examiner* — Catherine S Branch
(74) *Attorney, Agent, or Firm* — Curatolo Sidoti Co., LPA; Salvatore A. Sidoti; Joseph G. Curatolo

(57) ABSTRACT

A polymerization initiator system for reactive monomers and unsaturated polymers which is contains a Group 4 transition metal or Group 4 transition metal-containing compound, peroxide or diazo compound that is capable of being reduced by the Group 4 transition metal or Group 4 transition metal-containing compound, and pinacol compound is disclosed. Further disclosed are methods for preparing the polymerization initiator and using the polymerization initiator for low temperature curing.

40 Claims, No Drawings

US 9,593,173 B2

LOW TEMPERATURE CURE POLYMERIZATION INITIATOR

TECHNICAL FIELD

The present disclosure relates to polymerization initiators for reactive monomers and unsaturated polymers. The present disclosure more particularly relates to polymerization initiator compositions that are based on mixtures of a pinacol and a peroxide or diazo compound that can be used in combination with a Group 4 transition metal in curing unsaturated polymers and/or monomers at low temperatures as low as 25° C.

BACKGROUND

Organic peroxides are the industry standard for polymerizing unsaturated polyester resins. Depending on the peroxide structure, cure can be achieved at room temperature to elevated temperatures of 180° C. The desire to cure at low temperature (below 120° C.) is almost uniformly desired. In addition to the obvious energy savings, throughput can be significantly increased by not having to raise the temperature of the article to be cured. Alternate low temperature initiating systems may include diazo compounds as well. The drawback to low temperature curing peroxides or diazo compounds is the stability of the peroxide or diazo compound. Many of the peroxides must be stored at low temperatures and shipped under refrigerated conditions. The thermal instability and handling is a well known danger to employees who use these materials. The other disadvantage being that low temperature cure peroxides give rise to short pot-life of catalyzed materials.

Promoters can also be used in combination with peroxides to lower cure temperature. It is common practice to use promoters, such as cobalt, iron, and manganese derivatives to accelerate cure at low temperature. Amines, acetoacetates and amides may also be used in combination with metals such as cobalt to promote peroxide decomposition and give a high radical flux needed for cure.

Benzopinacol has been known for some time as a suitable radical polymerization initiator. However, the reactivity and end product properties have not been sufficient enough to overcome the extra preparation expense compared to peroxide based radical initiators. To improve reactivity and solubility, the potassium and sodium salts of benzopinacol have been reacted with di-, tri-, and tetra chlorosilanes or polyorganosilane/siloxane materials. These products have had limited commercial success, however, they have never been shown to significantly lower cure temperature in unsaturated polymers.

A polyurethane derivatized benzopinacol initiator is known and was reported to behave as a "living" catalyst. The reactivity is also similar to benzopinacol itself. Similar work was shown by Chen, et. al. (European Polymer Journal, 36 (2000) 1547-1554) using monofunctional isocyanates, such as phenylisocyanate. These initiators were also found to be "living" catalysts.

Bromoacetyl derivatives of benzopinacol are known as flame retardant initiators for the polymerization of unsaturated polyester (UPE) systems. Additionally, phosphorus and silyl ethers of benzopinacol as flame retardant initiators for UPE systems have been reported.

The use of Ti (III) species in the reduction of hydroperoxides has been investigated. For example, the radical aminoalkylation of ethers via t-butylhydroperoxide reduction by $TiCl_3$ has been studied. It has also been shown that in-situ generation of the unstable Ti (III) species could also be accomplished catalytically via zinc metal or manganese metal reduction of a Ti (IV) species. However, it is not known in the art to use a pinacol compound or any organic materials in the reduction of Ti (IV) to Ti (III) as in the present disclosure.

SUMMARY

Provided is a polymerization initiator system comprising (i) a pinacol compound, (ii) a Group 4 transition metal or Group 4 transition metal-containing compound, and (iii) an electron-accepting species that is capable of being reduced and generating a radical that is capable of initiating polymerization.

According to certain illustrative embodiments, the polymerization initiator system comprises (i) a reaction product of a pinacol compound and a Group 4 transition metal or Group 4 transition metal-containing compound and (ii) an electron-accepting species that is capable of being reduced and generating a radical that is capable of initiating polymerization.

Additionally provided is a polymerization process comprising adding a polymerization initiator system comprising either (A) a mixture of (i) a pinacol compound, (ii) a Group 4 transition metal or Group 4 transition metal-containing compound, and (iii) an electron-accepting species that generates a radical that is capable of initiating polymerization, or (B) a mixture of (i) the reaction product of a pinacol compound and a Group 4 transition metal or Group 4 transition metal-containing compound and (ii) an electron-accepting species that generates a radical that is capable of initiating polymerization, to a reactive monomer, or an unsaturated polymer, or a mixture of unsaturated polymer and reactive monomer; and polymerizing said reactive monomer and/or unsaturated polymer.

According to certain illustrative embodiments, the polymerization process comprises adding a Group 4 transition metal or Group 4 transition metal-containing compound to a reactive monomer, or an unsaturated polymer, or a mixture of unsaturated polymer and reactive monomer to prepare a first mixture; adding a pinacol compound and an electron-accepting species that generates a radical that is capable of initiating polymerization to a reactive monomer, or an unsaturated polymer, or a mixture of unsaturated polymer and reactive monomer to prepare a second mixture; combining said first mixture and said second mixture; and polymerizing said reactive monomer and/or unsaturated polymer present in said combined first and second mixture.

Also provided is a two component kit for polymerization reaction comprising separate first and second components. According to certain embodiments, the kit comprises a first component comprising a pinacol and a Group 4 transition metal or Group 4 transition metal-containing compound and a second component comprising an electron-accepting species that generates a radical that is capable of initiating polymerization. According to other illustrative embodiments, the kit comprises a first component comprising a pinacol and an electron-accepting species that generates a radical that is capable of initiating polymerization, and a second component comprising a Group 4 transition metal or Group 4 transition metal-containing compound

DETAILED DESCRIPTION

Disclosed is a polymerization initiator system which allows low temperature cure of unsaturated systems without the use of traditional promoters or unstable peroxides. As used throughout this specification, the term "low temperature cure" refers to curing of a polymer at a temperature below 120° C. According to certain embodiments, the term "low temperature cure" refers to curing a polymer at a temperature of 90° C. or lower. According to certain embodiments, the term "low temperature cure" refers to curing a polymer at a temperature of 80° C. or lower. According to certain embodiments, the term "low temperature cure" refers to curing a polymer at a temperature of 25° C. A thoroughly cured article is obtained even at temperatures as low as 25° C. No surface inhibition or surface tackiness is observed in the final cured product with the present polymerization initiator composition. The use of the present polymerization initiator system also allows for two component systems with mix ratios of any range as compared to peroxide systems where a small amount of a dangerous peroxide, typically 1-3% by weight, must be mixed in the resin material.

The polymerization initiator system comprises (i) a pinacol compound, (ii) a Group 4 transition metal or Group 4 transition metal-containing compound, and (iii) an electron-accepting species that generates a radical that is capable of initiating polymerization. According to certain illustrative embodiments, the polymerization initiator system comprises (i) a pinacol compound, (ii) a Group 4 transition metal or Group 4 transition metal-containing compound, and (iii) a peroxide or diazo compound. Alternatively, according to other illustrative embodiments, the polymerization initiator system comprises (i) a reaction product of a pinacol compound and a Group 4 transition metal or Group 4 transition metal-containing compound and (ii) a peroxide or diazo compound.

According to certain illustrative embodiments, the pinacol compound of the polymerization initiator system comprises the following general formula:

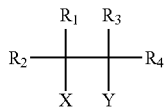

wherein $R_1$ and $R_3$ are the same or different substituted or unsubstituted aromatic groups;
wherein $R_2$ and $R_4$ are the same or different substituted or unsubstituted aliphatic or aromatic groups; and
wherein X and Y are the same or different and may comprise hydroxyl, alkoxy, or aryloxy groups.

According to certain illustrative embodiments, the pinacol comprises the following formula:

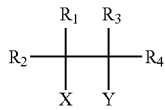

wherein $R_1$-$R_4$ unsubstituted aromatic groups; and
wherein X and Y are the same or different and may comprise hydroxyl, alkoxy, or aryloxy groups.

According to certain illustrative embodiments, the pinacol comprises benzopinal of the following formula:

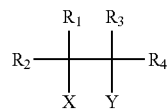

wherein $R_1$-$R_4$ unsubstituted phenyl groups; and
wherein X and Y are both hydroxyl groups.

According to certain illustrative embodiments, the pinacol compound of the polymerization initiator system comprises a benzopinacol of the following general formula:

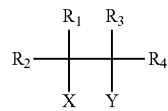

wherein $R_1$-$R_4$ are the same or different substituted aromatic groups; and
wherein X and Y are the same or different and may comprise hydroxyl, alkoxy, or aryloxy groups.

According to certain illustrative embodiments, the pinacol compound of the polymerization initiator system comprises a benzopinacol of the following general formula:

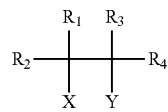

wherein $R_1$-$R_4$ are each substituted phenyl groups; and
wherein X and Y are both hydroxyl groups. Where one or more of the phenyl groups of $R_1$-$R_4$ are substituted, this compound may be referred to as a benzopinacol derivative or a derivative of benzopinacol.

As used throughout this specification, the term "Group 4 transition metal" refers to any transition metal found in Group 4 vertical column of the periodic table of elements. For avoidance of doubt, the Group 4 transition metals include Ti, Zr, Hf and Rf.

As used throughout this specification, the term "peroxide compound" refers to any chemical compound that contains the 0-0 group, also known as the peroxide group or the peroxo group.

As used throughout this specification, the term "diazo compound" refers to any organic compound that contains two bonded N atoms as a terminal functional group.

In order to achieve low temperature cure, according to certain embodiments, the process utilizes benzopinacol, a peroxide, and a metal-organic titanium or zirconium compound as the initiator system for unsaturated polyester resins containing styrene or other reactive monomers. The radical polymerization initiators used in the process allows low temperature cure without the use of unstable peroxides or promoters when the resins are cured into articles of commerce.

Without limitation, and only by way of illustration, suitable metal-organic titanium compounds include titanates such as tetrabutyltitanate, tetra t-butyltitanate, tetraisopropyltitanate, tetra n-propyltitanate, chlorotributyltitanate, dichlorodibutyltitanate, titanium diisopropoxide (bis-2,4-pentanedionate)(Tyzor GBA), titanium diisopropoxide bis (ethylacetoacetate), cyclopentadienyltitanium trichloride, titanium tetrachloride, titanium tetrabromide, titanocene dichloride, alkyl substituted titanocene dichloride, alkyl substituted cyclopentadienyl titanium trimethoxide, titanium triisostearoylisopropoxide, titanium tetrakis(bis2,2-(allyloxy-methyl)butoxide, titanium triacrylatemethoxyethoxyethoxide, cresyltitanate, phenyltitanium triisopropoxide, and titanium 3,6-dioxaheptanoate. Titanium (III) compounds may also be used, but would be less stable than the corresponding titanium (IV) complexes.

Without limitation, and only by way of illustration, suitable metal-organic zirconium compounds may include zirconates such as tetrabutylzirconate, tetraisopropylzirconate, tetra n-propylzirconate, zirconium di-n-butoxide (bis-2,4-pentanedionate), zirconium (tetra-2,4-pentanedionate), zirconium diisopropoxide bis(ethylacetoacetate), cyclopentadienylzirconium trichloride, zirconium tetrachloride, zirconium tetrabromide, zirconocene dichloride, alkyl substituted zirconocene dichloride, alkyl substituted cyclopentadienyl zirconocene trimethoxide. Zirconium (III) may be used, but would be less stable than the corresponding zirconium (IV) complexes.

As disclosed above, according to certain illustrative embodiments, the pinacol compound comprises benzopinacol where each of $R_1$-$R_4$ are phenyl rings and the X and Y groups are both hydroxyl groups. According to certain illustrative embodiments, one or more of the phenyl rings on the benzopinacol molecule may be substituted. For example, and without limitation, one or more of the phenyl rings on the benzopinacol molecule may include alkyl, aryl, alkoxy, halogen substitutions which provide derivatives of benzopinacol.

A titanium alkoxide of benzopinacol may be used in combination with a peroxide or diazo compound as a polymerization initiator system. The titanium alkoxide of benzopinacol may be prepared by reacting benzopinacol with tetraalkyltitanate. The tetraalkyltitanate may be dissolved in an inert solvent. According to certain illustrative embodiments, the tetraalkyltitanate or other titanate with leaving groups may comprise tetrabutyltitanate, tetra t-butyltitanate, tetraisopropyltitanate, tetra n-propyltitanate, chlorotributyltitanate, dichlorodibutyltitanate, titanium di-n-butoxide (bis-2,4-pentanedionate), titanium diisopropoxide bis(ethylacetoacetate), cyclopentadienyltitanium trichloride, titanium tetrachloride, titanium tetrabromide, titanocene dichloride, titanium triisostearoylisopropoxide, titanium tetrakis(bis2,2-(allyloxy-methyl)butoxide, titanium triacrylatemethoxyethoxyethoxide, cresyltitanate, phenyltitanium triisopropoxide, and titanium 3,6-dioxaheptanoate. The tetrabutyltitanate (1 mol) may be dissolved in an inert solvent, such as toluene. There is no limitation on the type of solvent or combinations of solvents that may be used in the process for preparing the titanium alkoxides of benzopinacol and other solvents may be used as long as they are nonreactive. Benzopinacol (1 mol) and another mono, di-, or tri-functional alcohol (ROH, 0-1 mol) is added to the dissolved tetraalkyltitanate. The mixture is subjected to vacuum distillation (rotary evaporator) to remove the solvent under reduced pressure. The process is continued until the solvent and butyl alcohol were removed.

According to certain illustrative embodiments, the process for preparing a polymerization initiator system comprising a mixture of (i) a reaction product of a benzopinacol and a Group 4 transition metal or Group 4 transition metal-containing compound and (ii) an electron-accepting species that generates a radical that is capable of initiating polymerization (such as a peroxide or diazo compound) includes preparing a titanium or zirconium alkoxide of benzopinacol. The process comprises reacting benzopinacol or a derivative of benzopinacol with a metal-organic titanium or zirconium compound that has volatile ligands, and optionally, an inert solvent.

According to certain illustrative embodiments, the titanium or zirconium alkoxide of benzopinacol comprises the following general formula:

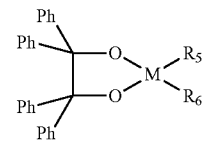

wherein M comprises titanium or zirconium; and wherein $R_5$ and $R_6$ may be the same or different and comprise an organic moiety. According to certain illustrative embodiments the organic moiety may comprise alkyl, alkoxy, or aryl groups.

According to certain illustrative embodiments, the titanium or zirconium alkoxide of benzopinacol comprises the following general formula:

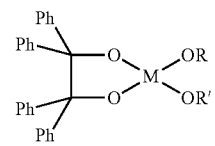

wherein M comprises a metal selected from titanium and zirconium; and wherein R and R' comprise an organic moiety.

According to certain illustrative embodiments, the process for preparing a titanium alkoxide of benzopinacol comprises the following general reaction scheme:

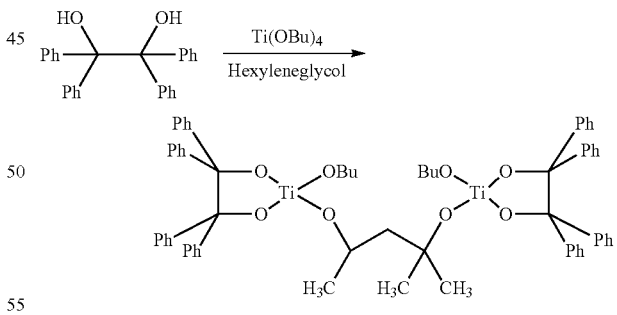

According to certain illustrative embodiments, the process for preparing a zirconium alkoxide of benzopinacol comprises the following general reaction scheme:

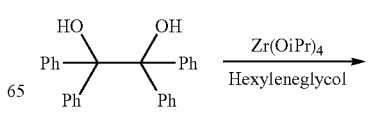

-continued

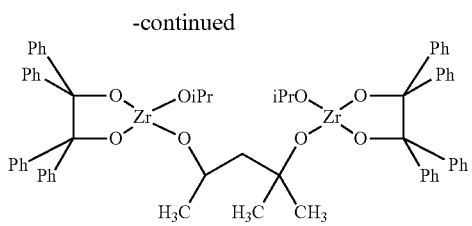

A wide variety of polyols can be used in the process of the preparation of the titanium alkoxide of benzopinacol and zirconium alkoxide of benzopinacol initiators. Suitable polyols include common diols such as ethylene glycol, propylene glycol, 1,3-propanediol, 1,4-propanediol, 1,4-butanediol, 2,2-dimethyl-1,3-propanediol, 2-methyl-1,3-propanediol, glycol ethers such as diethylene glycol and dipropylene glycol, and polyoxyalkylene glycols like polyoxyethylene glycol and polyoxypropylene glycol. Triols and higher functional polyols such as glycerol, trimethylol propane and oxyalkylated adducts thereof can also be used.

The polymerization initiator system may comprise a pinacol, such as benzopinacol, a Group 4 transition metal-containing compound, such as a metal-organic titanium or a metal-organic zirconium compound, and an electron-accepting species (such as a peroxide or diazo compound) that generates a radical that is capable of initiating polymerization. The electron-accepting species of the polymerization initiator system, which may also be referred to as a reducible species, is capable of accepting or otherwise gaining an electron from the Group 4 metal or Group 4 metal-compound, thereby being reduced and generating a radical that is capable of initiating polymerization of reactive monomers and UPE resins. For example, the metal-organic titanium or zirconium compound can be used catalytically in relation to the benzopinacol and peroxide. The benzopinacol undergoes homolytic bond disassociation at low temperature catalyzed by the metal-organic titanium or zirconium species. The resulting radical undergoes single electron transfer to the metal reducing it from the IV to the III oxidation state. The metal then reduces the peroxide or diazo compound to a radical species that initiates free radical polymerization. This scheme is shown below:

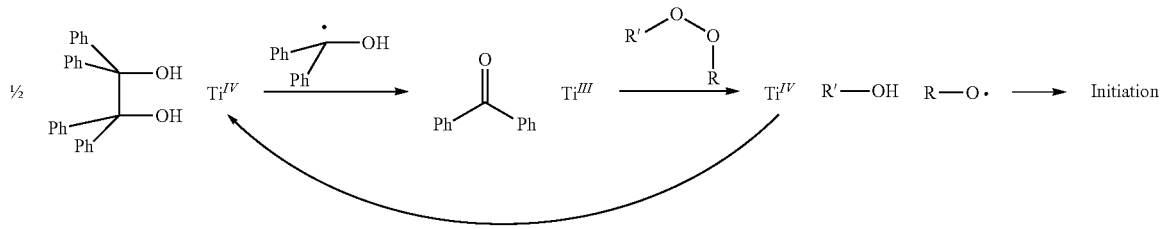

Preferably, the polyols are aliphatic or alicyclic and optionally contain C—O—C linkages.

Without limitation, and only by way of illustration, suitable peroxide compounds of the polymerization initiator system may include hydroperoxides, peroxyesters ketone peroxides, diacyl peroxides, peroxydicarbonates, peroxyketal, dialkyl peroxides and cyclic peroxides. Hydroperoxides may include, without limitation, t-butylhydroperoxide, cumylhydroperoxide and tetramethylbutyl hydroperoxide can be used. Peroxyesters may include, without limitation, t-butyl peroxyneodecanate, t-butylperoxypivalate, t-butylperoxybenzoate, t-amylperoxy-2-ethylhexanoate (commercially available Akzo Nobel Polymer Chemicals, LLC, Chicago, Ill. under the designation Trigonox 121) and 2,5-dimethyl-2,5-di)2-ethylhexanoylperoxy) hexane (commercially available Akzo Nobel Polymer Chemicals, LLC, Chicago, Ill. under the designation Trigonox 141). Dialkyl peroxides may include, without limitation, dicumyl peroxide and 2,5-dimethyl-2,5-)di-(t-butylperoxy) hexane (commercially available from Arkema, Inc. Philadelphia, Pa. under the designation Luprox 101).

The $t_{1/2}$ (0.1 hr) is a commonly utilized measure of peroxide stability. This is the temperature at which 50% of the peroxide is decomposed in 0.1 hours. Commonly used peroxides exhibit a $t_{1/2}$ (0.1 hr) in the range from 50° C. to 230° C. For cures at temperatures less than 100° C. one would typically use a peroxide with a $t_{1/2}$ of 120° C. or lower to achieve sufficient cure in a reasonable amount of time.

Without limitation, and only by way of illustration, suitable diazo compounds of the polyermization initiator system may include 2,2'-azodi(isobutyrolnitrile) (AIBN), 2,2'-azodi(2-methylbutyrolnitrile), and 1,1'-azodi(hexahydrobenzonitrile).

It is well known how unsaturated polyester (UPE) resins can be synthesized. The progress of the reaction can be followed by measuring the acid value of the mixture. Glycols are added along with unsaturated diacids that include maleic anhydride and the mixture is heated to about 355 to about 430° F. with some form of agitation such as stirring. Dicyclopentadiene may also be added with cracking (Diels-Alder chemistry) or under hydrolysis conditions to add to the polymer. Volatiles are removed, for example, by distillation and the acid value (as measured by ASTM D1639-90) and viscosity (as measured by ASTM D1545-89) of the mixture are monitored until the desired end-point is reached. In addition the reaction with the glycols can be carried out in the presence of oils containing ethylenic unsaturation such as soybean oil. The reaction mixture is cooled and monomer is added to give the desired UPE resins. Inhibitors can be added to the monomer for extending storage stability of the resin.

Examples of unsaturated carboxylic acids and corresponding anhydrides useful in the preparation of UPE resins include maleic acid, fumaric acid, itaconic acid and maleic anhydride. In addition other acids, anhydrides or esters of the acids can be added to modify the chemical composition. Non-limiting examples of such acids and anhydrides include phthalic acid, isophthalic acid, terephthalic acid, tetrahydrophthalic anhydride, phthalic anhydride, nadic anhydride, methylnadic anhydride, hexahydrophthalic anhydride, dimethyl terephthalate and the like. Maleic acid and maleic anhydride are used in illustrative embodiments.

Other materials commonly used in the synthesis of unsaturated polyester resins, such as solvents, isomerization catalysts, condensation catalysts, promoters, and the like can be used in the process. Non-limiting examples of solvents are those commonly known in the art and include but are not limited to hexane, cyclohexane, benzene, toluene, xylene, and mixtures of solvents. Commonly used inhibitors include hydroquinone, p-benzoquinone, di-t-butylhydroquinone, t-butylcatechol, phenothiazine, and the like. Catalysts used to promote the condensation reaction include p-toluene sulfonic acid, methane sulfonic acid, zinc salts (e.g. acetate), organotin compounds (dibutyl tin oxide) and other materials known to those skilled in the art. Isomerization catalysts may include organic amines such as morpholine and piperidine.

Further disclosed is a polymerization process comprising adding a polymerization initiator composition comprising pinacol, a Group 4 transition metal or Group 4 transition metal-containing compound, such as an metal-organic titanium or zirconium compound, and an electron-accepting species (such as a peroxide or diazo compound) that generates a radical that is capable of initiating polymerization, to reactive monomer with or without an unsaturated polymer, and polymerizing the reactive system. The process includes catalytically using the Group 4 metal or metal-containing compound to cause hemolytic bond disassociation of the pinacol, which generates a radical that undergoes single electron transfer to the metal reducing it from the IV to the III oxidation state, followed by reducing the electron-accepting species with the metal in the III oxidation state to generate a radical capable of initiating polymerization, and initiating polymerization with the radical generated by the reduction of the electron-accepting species.

According to certain illustrative embodiments, the polymerization process comprises separately adding (i) a Group 4 transition metal or Group 4 transition metal-containing compound such as a metal-organic titanium compound or a metal-organic zirconium compound, (ii) a pinacol compound such as benzopinacol and (iii) a peroxide or diazo compound to a reactive monomer, or an unsaturated polymer, or a mixture of unsaturated polymer and reactive monomer to create a mixture; and polymerizing said reactive monomer and/or unsaturated polymer in the mixture.

According to certain illustrative embodiments, the polymerization process comprises adding a Group 4 transition metal or Group 4 transition metal-containing compound such as a metal-organic titanium compound or a metal-organic zirconium compound to a reactive monomer, or an unsaturated polymer, or a mixture of unsaturated polymer and reactive monomer to prepare a first mixture, adding a pinacol compound such as benzopinacol and a peroxide or diazo compound to a reactive monomer, or an unsaturated polymer, or a mixture of unsaturated polymer and reactive monomer to prepare a second mixture, combining said first mixture and said second mixture, and polymerizing said reactive monomer and/or unsaturated polymer present in said combined first and second mixture.

Suitable examples of commercially available UPE resins that may be used in this process include Pedigree® 600 Styrene, Pedigree® 600 VT and Pedigree® 70 VT. All were uncatalyzed but can be cured with conventional peroxide initiators such as TBP or dicumylperoxide. The present disclosure is not limited to UPE resins used in electrical insulating materials but could also be used in molding materials and any other resin systems using UPE resins with reactive monomers such as, for example, styrene, vinyltoluene, diallylphthalate, acrylates, methacrylates, trimethylolpropane triacrylate, acrylated bisphenol A, methyl methacrylate, hydroxyethyl methacrylate, methyl acrylate, butanedioldimethacrylate, hexanedioldiacrylate, vinyl pyrrolidone, diallylmaleate, and butylvinylether.

In general, the process of catalyzing unsaturated polyesters may be carried out by two techniques. The first process involves introducing the Group 4 transition metal or Group 4 transition metal-containing compound, such as a metal-organic titanium or zirconium compound, into the resin. Without limitation, this may be accomplished either by means of mixing blade or dissolution with time and temperature. Some derivatives are more soluble than others and require less energy to dissolve the material into the UPE resin while others require more energy to achieve dissolution. The benzopinacol is added to the UPE resin with mixing. Benzopinacol may also be pre-dissolved or dispersed in another liquid prior to adding to the UPE resin solution. Finally the electron-accepting (ie, reducible species) such as peroxide or diazo compound can be added with mixing or pre-dissolved in another solvent if needed. According to certain embodiments, the Group 4 transition metal or Group 4 transition metal-containing compound such as the metal-organic titanium compound can be added to the UPE resin material at levels of about 0.001 to about 10% by weight. According to certain embodiments, the benzopinacol can be added to the UPE resin material at levels of about 0.1 to about 10%. According to certain embodiments, the electron-accepting species (peroxide or diazo compound) can be added to the UPE resin material at levels of about 0.1 to about 10%. According to alternative embodiments, the initiator system loading level is about 1 to about 4% to UPE resin material.

The second method involves mixing the Group 4 transition metal or Group 4 transition metal-containing compound such as the metal-organic titanium or zirconium compound into the resin system as to prepare a first mixture (part A) and the benzopinacol/peroxide (or diazo) into a separate portion of the resin as a second mixture (part B). The ratio of part A to part B can be adjusted by the concentration of the benzopinacol/peroxide and metal-organic titanium/zirconium compound so that the mix ratio delivers the desired concentration of initiator package to resin/monomer. The advantageous use of a 2-part system is that part A and part B both exhibit good shelf stability. With known prior art peroxide based systems with high reactivity this is not possible due to short stability times. A mix ratio approaching a 1:1 ratio for a 2-part system may be used. According to certain embodiments, the metal-organic titanium compound can be added to the UPE resin material at levels of about 0.001 to about 10%. According to certain embodiments, the benzopinacol and peroxide (diazo) can be added to the UPE resin material at levels of about 0.1 to about 10%.

It is well known that titanocenes have photocatalytic activity in the UV and visible light regions. Irradiating in this region will give some free radical polymerization, however, not enough to sufficiently cure an article of commerce. Use of titanocenes with in combination with benzopinacol and peroxides offers the opportunity of a dual cure mechanism. The photo activation providing some free radical polymerization followed by heat which will drive the final cure.

It is also well known in the art that benzopinacol is synthesized by excitation of benzophenone with UV light in the presence of isopropanol. Acetone and benzopinacol are formed. It is obvious that this methodology could also be used in a catalytic system in which benzophenone, isopropanol, Group 4 transition metal and a peroxide or diazo compound would initiate cure at low temperature. In this example, benzophenone would couple in the presence of UV light to form benzopinacol. Benzopinacol would then reduce the titanium (IV) species to titanium (III) forming benzophenone as a byproduct. The titanium (III) would reduce the peroxide to initiate cure and the benzophenone would be recycled to benzopinacol by UV light again.

The following examples are set forth to describe a method of synthesizing illustrative embodiments of the titanium or zirconium alkoxide of benzopinacol and preparing and using the polymerization initiator system in further detail and to illustrate exemplary method of preparation and use of the initiator system. The following examples following should not be construed as limiting the initiator, the methods of preparing the initiator or method of using the initiator in polymerization reactions in any manner.

Titanium Alkoxide of Benzopinacol Initiator Synthesis

Tetrabutyltitanate, 0.053 moles (18.02 grams), benzopinacol, 0.053 moles (19.4 grams), and hexylene glycol, 0.027 moles (3.127 grams), were dissolved in 250 grams of ethyl acetate and 250 grams of toluene and mixed about two hours at room temperature. Ethyl acetate, toluene and evolved butanol were removed by vacuum distillation (rotary evaporator) at 50° C. until the material was reduced to a yellow-brown liquid. 500 grams of toluene were added and the rotovap procedure was repeated. Another 500 grams of toluene was added and the rotovap procedure was again repeated. The result was a yellow-brown liquid/paste material, which was then dried at 40° C. to a somewhat thicker paste.

Zirconium Alkoxide of Benzopinacol Initiator Synthesis

Tetraisopropylzirconate, 0.053 moles (17.3 grams), benzopinacol, 0.053 moles (19.4 grams), and hexylene glycol, 0.027 moles (3.127 grams), were dissolved in 250 grams of ethyl acetate and 250 grams of toluene and mixed about two hours at room temperature. Ethyl acetate, toluene and evolved i-propanol were removed by vacuum distillation (rotary evaporator) at 50° C. until the material was reduced to a clear liquid. 500 grams of toluene were added and the rotovap procedure was repeated. Another 500 grams of toluene was added and the rotovap procedure was again repeated. The result was a colorless solid, which was then dried at 40° C.

Comparative Polymerization Example 1

Benzopinacol was blended into Pedigree 600S at 1% with a cowles blade until a dispersion was obtained. The material was then cured at 80° C. for one hour. The material was also tested with a Q200 Modulated DSC. The results are shown in Table 1. The sample was uncured after one hour at 80° C.

Comparative Polymerization Example 2

Titanocene dichloride was blended into Pedigree 600S at 1.0% until a homogenous mixture was obtained. The material was then cured at 80° C. for one hour. The material was also tested with a Q200 Modulated DSC. The results are shown in Table 1. The sample was uncured after one hour at 80° C.

Comparative Polymerization Example 3

Titanocene dichloride was blended into Pedigree 600S at 0.5% until a homogenous mixture was obtained. Benzopinacol was then blended into this mixture at 1% with a cowles blade until a dispersion was obtained. The material was then cured at 80° C. for one hour. The material was also tested with a Q200 Modulated DSC. The results are shown in Table 1. The sample was soft and only partially cured with a very tacky surface after one hour at 80° C.

Comparative Polymerization Example 4

T-butylperoxybenzoate (TBP) was blended into Pedigree 600S at 1.0% until a homogenous mixture was obtained. The material was then cured at 80° C. for one hour. The material was also tested with a Q200 Modulated DSC. The results are shown in Table 1. The sample was uncured after one hour at 80° C.

Comparative Polymerization Example 5

Titanocene dichloride was blended into Pedigree 600S at 1.0% until a homogenous mixture was obtained. T-butylperoxybenzoate was then blended into this mixture at 1% with a cowles blade until a dispersion was obtained. The material was then cured at 80° C. for one hour. The material was also tested with a Q200 Modulated DSC. The results are shown in Table 1. The sample was uncured after one hour at 80° C.

Comparative Polymerization Example 6

Tetrabutyltitanate (TNBT) was blended into Pedigree 600S at 1.0% until a homogenous mixture was obtained. T-butylperoxybenzoate was then blended into this mixture at 1% with a cowles blade until a dispersion was obtained. The material was then cured at 80° C. for one hour. The material was also tested with a Q200 Modulated DSC. The results are shown in Table 1. The sample was uncured after one hour at 80° C.

Comparative Polymerization Example 7

Tetrabutyltitanate was blended into Pedigree 600S at 1.0% until a homogenous mixture was obtained. Benzopinacol was then blended into this mixture at 1% with a cowles blade until a dispersion was obtained. The material was then cured at 80° C. for one hour. The material was also tested with a Q200 Modulated DSC. The results are shown in Table 1. The sample was soft and only partially cured with a very tacky surface after one hour at 80° C.

Polymerization Example 1

Titanocene dichloride was blended into Pedigree 600S at 0.50% until a homogenous mixture was obtained. T-butylperoxybenzoate was then blended into this mixture at 1% with a cowles blade until a dispersion was obtained. Benzopinacol was then added to the mixture at 1% and mixed until homogeneous. The material was then cured at 80° C. for one hour. The material was also tested with a Q200 Modulated DSC. The results are shown in Table 1. The sample was fully cured with a tack free surface after one hour at 80° C.

Polymerization Example 2

Tetrabutyltitanate was blended into Pedigree 600S at 1.0% until a homogenous mixture was obtained. T-butylperoxybenzoate was then blended into this mixture at 1% with a cowles blade until a dispersion was obtained. Benzopinacol was then added to the mixture at 1% and mixed until homogeneous. The material was then cured at 90° C. for one hour. The material was also tested with a Q200 Modulated DSC. The results are shown in Table 1. The sample was fully cured with a hard surface (slight tack) after one hour at 90° C.

Table 1 demonstrates that a thermally stable peroxyester initiator like TBP ($t_{1/2}$ 142° C.) can be used to cure monomers and unsaturated polyesters in the presence of benzopinacol and a Group 4 transition metal such as titanium at low temperatures. The catalytic cycle of Ti (IV) reduction is promoted by benzopinacol to Ti (III). This in turn reduces TBP to a peroxy radical which is very efficient in facilitating free radical polymerization. The comparative examples demonstrate that using TBP, benzopinacol or a titanium species alone, or as mixtures of two, do not promote thorough low temperature cure. While benzopinacol and titanium will initiate cure at low temperatures (DSC), air inhibition and low enthalpy of reaction (DSC) prevents thorough cure.

hour. The material was also tested with a Q200 Modulated DSC. The results are shown in Table 2. The sample was fully cured with a hard surface (slight tack) after one hour at 90° C.

Polymerization Example 6

Tetrabutyltitanate was blended into Pedigree 600S at 0.1% until a homogenous mixture was obtained. Dicumyl peroxide was then blended into this mixture at 1% with a cowles blade until a dispersion was obtained. Benzopinacol was then added to the mixture at 1% and mixed until homogeneous. The material was then cured at 90° C. for one hour. The material was also tested with a Q200 Modulated

TABLE 1

| | Example | | | | | | | | |
|---|---|---|---|---|---|---|---|---|---|
| | Comparative Example 1 | Comparative Example 2 | Comparative Example 3 | Comparative Example 4 | Comparative Example 5 | Comparativ Example 6 | Comparative Example 7 | Example 1 | Example 2 |
| Resin system | Pedigree 600S | Pedigree 600S | Pedigree 600S | Pedigree 600S | Pedigree 600S | Pedigree 600S | Pedigree 600S | Pedigree 600S | Pedigree 600S |
| Benzopinacol | 1 | — | 1 | — | — | — | 1 | 1 | 1 |
| TNBT | — | — | — | — | — | 1 | 1 | — | 1 |
| Titanocene | — | 1 | 0.5 | — | 1 | — | — | 0.5 | — |
| TBP | — | — | — | 1 | 1 | 1 | — | 1 | 1 |
| DSC analysis | | | | | | | | | |
| Onset (° C.) | 123.5 | 95.7 | 90.3 | 120.3 | 77 | 121.7 | 78.3 | 78.1 | 79.1 |
| Enthalpy (J/g) | 341.4 | 4.1 | 31.4 | 386.3 | 152.7 | 392.8 | 288.2 | 358.0 | 360.0 |
| Cure | 1 hr. @80 C. | 1 hr. @80 C. | 1 hr. @80 C. | 1 hr. @80 C. | 1 hr. @80 C. | 1 hr. @80 C. | 1 hr. @80 C. | 1 hr. @80 C. | 1 hr. @90 C. |
| Surface after cure | Uncured | Uncured | Very Tacky Soft | Uncured | Uncured | Uncured | Very Tacky Soft | Slight tack Hard | Slight tack Hard |
| Puck hardness | | | | | | | | | |

Polymerization Example 3

Tetrabutyltitanate was blended into Pedigree 600S at 1.0% until a homogenous mixture was obtained. Dicumyl peroxide was then blended into this mixture at 1% with a cowles blade until a dispersion was obtained. Benzopinacol was then added to the mixture at 1% and mixed until homogeneous. The material was then cured at 90° C. for one hour. The material was also tested with a Q200 Modulated DSC. The results are shown in Table 2. The sample was fully cured with a hard surface (no tack) after one hour at 90° C.

Polymerization Example 4

Tetrabutyltitanate was blended into Pedigree 600S at 1.0% until a homogenous mixture was obtained. Dicumyl peroxide was then blended into this mixture at 2% with a cowles blade until a dispersion was obtained. Benzopinacol was then added to the mixture at 1% and mixed until homogeneous. The material was then cured at 90° C. for one hour. The material was also tested with a Q200 Modulated DSC. The results are shown in Table 2. The sample was fully cured with a hard surface (no tack) after one hour at 90° C.

Polymerization Example 5

Tetrabutyltitanate was blended into Pedigree 600S at 1.0% until a homogenous mixture was obtained. Dicumyl peroxide was then blended into this mixture at 1% with a cowles blade until a dispersion was obtained. Benzopinacol was then added to the mixture at 0.5% and mixed until homogeneous. The material was then cured at 90° C. for one DSC. The results are shown in Table 2. The sample was fully cured with a hard surface (slight tack) after one hour at 90° C.

Polymerization Example 7

Tetrabutyltitanate was blended into Pedigree 600S at 0.1% until a homogenous mixture was obtained. Dicumyl peroxide was then blended into this mixture at 2% with a cowles blade until a dispersion was obtained. Benzopinacol was then added to the mixture at 1% and mixed until homogeneous. The material was then cured at 90° C. for one hour. The material was also tested with a Q200 Modulated DSC. The results are shown in Table 2. The sample was fully cured with a hard surface (slight tack) after one hour at 90° C.

Polymerization Example 8

Tetrabutyltitanate was blended into Pedigree 600S at 0.5% until a homogenous mixture was obtained. Dicumyl peroxide was then blended into this mixture at 1% with a cowles blade until a dispersion was obtained. Benzopinacol was then added to the mixture at 1% and mixed until homogeneous. The material was then cured at 90° C. for one hour. The material was also tested with a Q200 Modulated DSC. The results are shown in Table 2. The sample was fully cured with a hard surface (slight tack) after one hour at 90° C.

Examples 3-8 in Table 2 demonstrate that a thermally stable dialkylperoxide initiator like Dicumyl peroxide ($t_{1/2}$ 154° C.) can be used to cure monomers and unsaturated polyesters in the presence of benzopinacol and a Group 4 transition metal such as titanium, even at catalytic amounts, at low temperatures. The catalytic cycle of Ti (IV) reduction is promoted by benzopinacol to Ti (III). This in turn reduces Dicumyl peroxide to a peroxy radical which is very efficient in facilitating free radical polymerization. Benzopinacol can be used at lower levels (Example 5) but it does produce a slightly less cured material. Higher levels of peroxide (Examples 4 and 7) can also be used although no improvement in properties were observed.

peroxide was then blended into this mixture at 1% with a cowles blade until a dispersion was obtained. Benzopinacol was then added to the mixture at 1% and mixed until homogeneous. The material was then cured at 80° C. for one hour. The results are shown in Table 2. The sample was fully cured with a hard surface (no tack) after one hour at 80° C.

Polymerization Example 12

Tetrabutyltitanate was blended into Pedigree 600S at 1.% until a homogenous mixture was obtained. Dicumyl hydrop-

TABLE 2

| | Example | | | | | |
|---|---|---|---|---|---|---|
| | Example 3 | Example 4 | Example 5 | Example 6 | Example 7 | Example 8 |
| Resin | Pedigree 600S | Pedigree 600S | Pedigree 600S | Pedigree 600S | Pedigree 600S | Pedigree 600S |
| Benzopinacol | 1 | 1 | 0.5 | 1 | 1 | 1 |
| TNBT | 1 | 1 | 1 | 0.1 | 0.1 | 0.5 |
| Dicup | 1 | 2 | 1 | 1 | 2 | 1 |
| DSC | | | | | | |
| Onset temp | 77.3 | 84.7 | | | | 90.6 |
| Enthalpy J/g | 368.9 | 368.7 | | | | 371.1 |
| Puck* | | | | | | |
| Surface after cure | No tack | No tack | Slight tack | Slight tack | Slight tack | No tack |
| Puck hardness | Hard | Hard | Hard | Hard | Hard | Hard |

*Cured for 1 hr @90 C.

Comparative Polymerization Example 8

Titanocene dichloride was blended into Pedigree 600S at 1% until a homogenous mixture was obtained. Dicumyl peroxide was then blended into this mixture at 1% with a cowles blade until a dispersion was obtained. The material was then cured at 80° C. for one hour. The material was also tested with a Q200 Modulated DSC. The results are shown in Table 3. The sample was uncured after one hour at 80° C.

Polymerization Example 9

Titanocene dichloride was blended into Pedigree 600S at 0.5% until a homogenous mixture was obtained. Dicumyl peroxide was then blended into this mixture at 1% with a cowles blade until a dispersion was obtained. Benzopinacol was then added to the mixture at 1% and mixed until homogeneous. The material was then cured at 80° C. for one hour. The material was also tested with a Q200 Modulated DSC. The results are shown in Table 2. The sample was fully cured with a hard surface (no tack) after one hour at 80° C.

Polymerization Example 10

Titanocene dichloride was blended into Pedigree 600S at 0.5% until a homogenous mixture was obtained. Dicumyl peroxide was then blended into this mixture at 1% with a cowles blade until a dispersion was obtained. Benzopinacol was then added to the mixture at 0.5% and mixed until homogeneous. The material was then cured at 80° C. for one hour. The results are shown in Table 2. The sample was fully cured with a hard surface (no tack) after one hour at 80° C.

Polymerization Example 11

Titanocene dichloride was blended into Pedigree 600S at 0.25% until a homogenous mixture was obtained. Dicumyl eroxide was then blended into this mixture at 1% with a cowles blade until a dispersion was obtained. Benzopinacol was then added to the mixture at 1% and mixed until homogeneous. The material was then cured at 80° C. for one hour. The results are shown in Table 2. The sample was fully cured with a hard surface (no tack) after one hour at 80° C.

Polymerization Example 13

Titanocene dichloride was blended into Pedigree 600S at 0.5% until a homogenous mixture was obtained. Dicumyl hydroperoxide was then blended into this mixture at 1% with a cowles blade until a dispersion was obtained. Benzopinacol was then added to the mixture at 1% and mixed until homogeneous. The material was then cured at 80° C. for one hour. The results are shown in Table 2. The sample was fully cured with a hard surface (no tack) after one hour at 80° C.

Polymerization Example 14

Titanocene dichloride was blended into Pedigree 600S at 0.25% until a homogenous mixture was obtained. Dicumyl hydroperoxide was then blended into this mixture at 1.0% with a cowles blade until a dispersion was obtained. Benzopinacol was then added to the mixture at 1.0% and mixed until homogeneous. The material was then cured at 80° C. for one hour. The results are shown in Table 2. The sample was fully cured with a hard surface (no tack) after one hour at 80° C.

Examples 9-14 in Table 3 demonstrate that a thermally stable dialkylperoxide initiator like dicumyl peroxide ($t_{1/2}$ 154° C.) and a hydroperoxide like cumene hydroperoxide ($t_{1/2}$ 195° C.) can be used to cure monomers and unsaturated polyesters in the presence of benzopinacol and a Group 4 transition metal like titanium, even at catalytic amounts, at low temperatures. The catalytic cycle of Ti (IV) reduction is promoted by benzopinacol to Ti (III). This in turn reduces dicumyl peroxide or cumyl hydroperoxide to a peroxy radical which is very efficient in facilitating free radical polymerization. Comparative Example 8 demonstrates that without the presence of benzopinacol the catalytic cycle of Ti (IV) reduction to Ti (III) is broken and no low temperature cure takes place.

blended into this mixture at 0.5% with a cowles blade until a dispersion was obtained. The material was then cured at 80° C. for one hour. The results are shown in Table 4. The sample was fully cured with a hard surface (no tack) after one hour at 80° C.

Examples 15 and 16 in Table 4 demonstrates that another thermally stable dialkyl peroxide initiator like Luprox 101 ($t_{1/2}$ 164° C.) can be used to cure monomers and unsaturated polyesters in the presence of benzopinacol and a Group 4

TABLE 3

| | Comparative Example 8 | Example 9 | Example 10 | Example 11 | Example 12 | Example 13 | Example 14 |
|---|---|---|---|---|---|---|---|
| Resin | Pedigree 600S | Pedigree 600S | Pedigree 600S | Pedigree 600S | Pedigree 600S | Pedigree 600S | Pedigree 600S |
| Benzopinacol | — | 1 | 0.5 | 1 | 1 | 1 | 1 |
| Titanocene | 1 | 0.5 | 0.5 | 0.25 | — | 0.5 | 0.25 |
| TNBT | — | — | — | — | 1 | — | — |
| DICUP | 1 | 1 | 1 | 1 | — | — | — |
| Cumene hydroperoxide | | | | | 1 | 1 | 1 |
| DSC | | | | | | | |
| Onset | 128.2 | 98.9 | | | | | |
| Enthalpy J/g | 369.6 | 371.5 | | | | | |
| Puck* | | | | | | | |
| Surface after cure | uncured | No tack | No tack | No tack | No tack | No tack | No tack |
| Puck hardness | | Hard | Hard | Hard | Hard | Hard | Hard |

*Cured for 1 hr at 80 C.

Comparative Polymerization Example 9

Luprox 101 was blended into Pedigree 600S at 1% until a homogenous mixture was obtained. The material was then cured at 80° C. for one hour. The results are shown in Table 4. The sample was uncured after one hour at 80° C.

Comparative Polymerization Example 10

Titanocene dichloride was blended into Pedigree 600S at 0.5% until a homogenous mixture was obtained. Luprox 101 was then blended into this mixture at 1% with a cowles blade until a dispersion was obtained. The material was then cured at 80° C. for one hour. The results are shown in Table 4. The sample was soft and partially cured with a tacky surface after one hour at 80° C.

Polymerization Example 15

Titanocene dichloride was blended into Pedigree 600S at 0.5% until a homogenous mixture was obtained. Luprox 101 was then blended into this mixture at 1% with a cowles blade until a dispersion was obtained. Benzopinacol was then blended into this mixture at 1% with a cowles blade until a dispersion was obtained. The material was then cured at 80° C. for one hour. The results are shown in Table 4. The sample was fully cured with a hard surface (no tack) after one hour at 80° C.

Polymerization Example 16

Titanocene dichloride was blended into Pedigree 600S at 0.5% until a homogenous mixture was obtained. Luprox 101 was then blended into this mixture at 1% with a cowles blade until a dispersion was obtained. Benzopinacol was then transition metal like titanium, even at catalytic amounts, at low temperatures. The catalytic cycle of Ti (IV) reduction is promoted by benzopinacol to Ti (III). This in turn reduces Luprox 101 to a peroxy radical which is very efficient in facilitating free radical polymerization. Comparative Examples 9 and 10 again demonstrates that without the presence of benzopinacol the catalytic cycle of Ti (IV) reduction to Ti (III) is broken and no low temperature cure takes place.

TABLE 4

| | Comparative Example 9 | Comparative Example 10 | Example 15 | Example 16 |
|---|---|---|---|---|
| Resin | Pedigree 600S | Pedigree 600S | Pedigree 600S | Pedigree 600S |
| Benzopinacol | | | 1 | 0.5 |
| Titanocene | | 0.5 | 0.5 | 0.5 |
| Luprox 101 | 1 | 1 | 1 | 1 |
| Puck* | | | | |
| Surface after cure | Uncured | Very tacky | No tack | No tack |
| Puck hardness | | Soft | Hard | Hard |

*Cured for 1 Hr @80 C.

Polymerization Example 17

Titanocene dichloride was blended into Pedigree 600S at 0.5% until a homogenous mixture was obtained. AIBN was then blended into this mixture at 0.5% with a cowles blade until a dispersion was obtained. Benzopinacol was then blended into this mixture at 1% with a cowles blade until a dispersion was obtained. The material was then cured at 80°

C. for one hour. The results are shown in Table 5. The sample was fully cured with a hard surface (no tack) after one hour at 80° C.

Example 17 in Table 5 demonstrates that a diazo initiator such as AIBN ($t_{1/2}$ 101° C.) can be used to cure monomers and unsaturated polyesters in the presence of benzopinacol and a Group 4 transition metal like titanium at low temperatures. The catalytic cycle of Ti (IV) reduction is promoted by benzopinacol to Ti (III). This in turn reduces AIBN to a alkyl radical which is very efficient in facilitating free radical polymerization.

TABLE 5

|  | Example<br>Example 17 |
| --- | --- |
| Resin | Pedigree 600S |
| Benzopinacol | 1 |
| Titanocene | 0.5 |
| AIBN | 0.5 |
| Puck | Cured for 1 hr. @80 C. |
| Surface after cure | No tack |
| Puck hardness | Hard |

Comparative Polymerization Example 11

Aluminum acetylacetonate was blended into Pedigree 600S at 0.5% until a homogenous mixture was obtained. Benzopinacol was then blended into this mixture at 1% with a cowles blade until a dispersion was obtained. Dicumyl peroxide was then blended into this mixture at 1% with a cowles blade until a dispersion was obtained. The material was then cured at 80° C. for one hour. The results are shown in Table 6. The sample was uncured after one hour at 80° C.

Comparative Polymerization Example 12

Triisopropyl borate was blended into Pedigree 600S at 1.0% until a homogenous mixture was obtained. Benzopinacol was then blended into this mixture at 1% with a cowles blade until a dispersion was obtained. Dicumyl peroxide was then blended into this mixture at 1% with a cowles blade until a dispersion was obtained. The material was then cured at 80° C. for one hour. The results are shown in Table 6. The sample was uncured after one hour at 80° C.

Comparative Polymerization Example 13

Initiator 1—Nickel based Initiator having the following structure

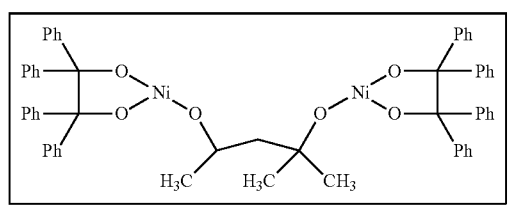

was blended into Pedigree 600S at 0.5% until a homogenous mixture was obtained. Benzopinacol was then blended into this mixture at 1% with a cowles blade until a dispersion was obtained. Dicumyl peroxide was then blended into this mixture at 1.0% with a cowles blade until a dispersion was obtained. The material was then cured at 80° C. for one hour. The results are shown in Table 6. The sample was uncured after one hour at 80° C.

Polymerization Example 18

Initiator 2—Zirconium based Initiator having the following structure

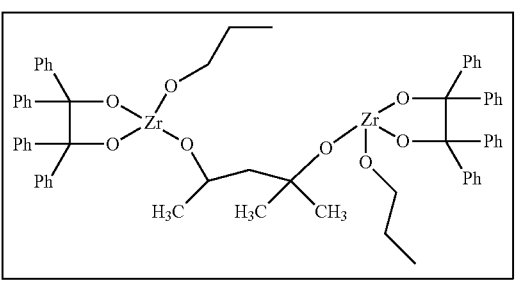

was blended into Pedigree 600S at 0.5% until a homogenous mixture was obtained. Dicumylhydroperoxide was then blended into this mixture at 1% with a cowles blade until a dispersion was obtained. Benzopinacol was then blended into this mixture at 1% with a cowles blade until a dispersion was obtained. The material was then cured at 80° C. for one hour. The results are shown in Table 6. The sample was fully cured with a hard surface (no tack) after one hour at 80° C.

Examples 10 and 18 in Table 6 demonstrate that a thermally stable dialkylperoxide initiator like Dicumyl peroxide ($t_{1/2}$ 154° C.) and a hydroperoxide like Cumene hydroperoxide ($t_{1/2}$ 195° C.) can be used to cure monomers and unsaturated polyesters in the presence of benzopinacol and a Group 4 transition metal like titanium or zirconium, even at catalytic amounts, at low temperatures. The catalytic cycle of Ti or Zr (IV) reduction is promoted by benzopinacol to Ti or Zr (III). This in turn reduces Dicup or cumyl hydroperoxide to a peroxy radical which is very efficient in facilitating free radical polymerization. Comparative Examples 11-13 demonstrates that non Group 4 metals do not accelerate low temperature cure when used in combination with benzopinacol and peroxide.

TABLE 6

|  | Example | | | | |
| --- | --- | --- | --- | --- | --- |
|  | Example 10 | Comparative Example 11 | Comparative Example 12 | Comparative Example 13 | Example 18 |
| Resin | Pedigree 600S | Pedigree 600S | Pedigree 600S | Pedigree 600S | Pedigree 600S |

TABLE 6-continued

| | Example 10 | Comparative Example 11 | Comparative Example 12 | Comparative Example 13 | Example 18 |
|---|---|---|---|---|---|
| Benzopinacol | 1 | 1 | 1 | 1 | 1 |
| Titanocene | 0.5 | | | | |
| Aluminum acetylacetonate | | 0.5 | | | |
| Tri isopropyl borate | | | 1 | | |
| Initiator 1 | | | | 0.5 | |
| Initiator 2 | | | | | 0.5 |
| DICUP | 1 | 1 | 1 | 1 | |
| Cumene Hydroperoxide | | | | | 1 |
| Puck* | | | | | |
| Surface after cure | No tack | Not cured | Not cured | Not cured | No tack |
| Puck hardness | Hard | | | | Hard |

*Cured for 1 hr. @80° C.

Polymerization Examples 19-22

UPE 600S was split in two portions of equal weight. One portion was mixed with benzopinacol at 1% and peroxide (1%) with a cowles blade until a solution was obtained. The second portion was mixed with Tyzor GBA, an organotitanium (IV) species. Both portions are stable at room temperature for a number of days. The two portions are then mixed and let cure at room temperature (25° C.). The results are shown in Table 7. The samples were cured with a hard surface lower surface after three hour at 25° C. Example 22 exhibited a dry top surface as well.

Examples 19-22 in Table 7 demonstrate that a thermally stable dialkylperoxide initiator like Dicumyl peroxide ($t_{1/2}$ 154° C.) and a hydroperoxide like t-butyl hydroperoxide ($t_{1/2}$ 207° C.) can be used to cure monomers and unsaturated polyesters in the presence of benzopinacol and a Group 4 transition metal like Tyzor GBA at room temperature and short periods of time. Using combination of titanate species such as Tyzor GBA and Titanocene can not only give a hard cured material but also a dry tack free surface. These examples also demonstrate the ability to use two stable solutions that when mixed exhibit high reactivity, even curing at room temperature.

TABLE 7

| | Example 19 | Example 20 | Example 21 | Example 22 |
|---|---|---|---|---|
| Resin | Pedigree 600S | Pedigree 600S | Pedigree 600S | Pedigree 600S |
| Benzopinacol | 1 | 1 | 1 | 1 |
| Tyzor GBA | 1 | 7 | 1 | 1 |
| Titanocene | | | | 0.5 |
| DICUP | 1 | | | |
| Luperox 101 | | 1 | | |
| Luperox TBH70X | | | 1 | 1 |
| Puck* Surface | Wet surface after 3 hrs. | Wet surface after 3 hrs. | Wet surface after 3 hrs. | No tack after 3 hrs |
| Puck hardness | hard | hard | hard | hard |

*Cured at 25° C.

Comparative Polymerization Examples 14-15

Peroxide shown in Table 8 was blended into Pedigree 70VT at 1.0% until a homogenous mixture was obtained. The material was then cured at 80° C. for one hour. The results are shown in Table 8. The samples were uncured after one hour at 80° C.

Polymerization Examples 23-27

Titanocene dichloride was blended into Pedigree 70VT at 0.5% until a homogenous mixture was obtained. Peroxide was then blended into this mixture at 1% with a cowles blade until a dispersion was obtained. Benzopinacol was then blended into this mixture at 1% with a cowles blade until a solution was obtained. The material was then cured at 80° C. for one hour. The results are shown in Table 8. The samples were fully cured with tack to no tack after one hour at 80° C.

Examples 23-27 in Table 8 demonstrates that vinyl toluene monomer is also curable at low temperature much like styrene. Comparative Examples 14-15 again demonstrates that without the presence of benzopinacol the catalytic cycle of Ti (IV) reduction to Ti (III) is broken and no low temperature cure takes place.

TABLE 8

| | Example 23 | Example 24 | Example 25 | Example 26 | Example 27 | Comparative Example 14 | Comparative Example 15 |
|---|---|---|---|---|---|---|---|
| Resin | PED 70 V.T. POLYESTER RESIN (307499) | PED 70 V.T. POLYESTER RESIN (307499) | PED 70 V.T. POLYESTER RESIN (307499) | PED 70 V.T. POLYESTER RESIN (307499) | PED 70 V.T. POLYESTER RESIN (307499) | PED 70 V.T. POLYESTER RESIN (307499) | PED 70 V.T. POLYESTER RESIN (307499) |

TABLE 8-continued

|  | Example 23 | Example 24 | Example 25 | Example 26 | Example 27 | Comparative Example 14 | Comparative Example 15 |
|---|---|---|---|---|---|---|---|
| Benzopinacol | 1 | 1 | 1 | 1 | 1 |  |  |
| Titanocene | 0.5 | 0.5 | 0.5 | 0.5 | 0.5 |  |  |
| DICUP | 1 |  |  |  |  |  |  |
| Luperox 101 |  | 1 |  |  |  |  |  |
| Luperox THB70X |  |  | 1 |  |  |  | 1 |
| Dicumyl Hydroperoxide |  |  |  | 1 |  | 1 |  |
| TBP |  |  |  |  | 1 |  |  |
| Puck* |  |  |  |  |  |  |  |
| Surface H | Very tacky before and after cooling | Tacky surface on hot cold | Slight sticky on hot, tack free on cooling | Slight stick on hot, tack free on cooling | Slight sticky on hot, tack free on cooling | Did not cure | Did not cure |
| Hardness | Soft | Hard | Hard | Hard | Hard |  |  |

*Cured at 80 C. for 1 hr.

Polymerization Examples 28-32

Titanocene dichloride was blended into Pedigree 600 Acrylate at 0.5% until a homogenous mixture was obtained. Peroxide was then blended into this mixture at 1.0% with a cowles blade until a solution was obtained. Benzopinacol was then blended into this mixture at 1.0% with a cowles blade until a solution was obtained. The material was then cured at 80° C. for one hour. The results are shown in Table 9. The samples were fully cured with tack to no tack after one hour at 80° C., except where noted. Ducumyl peroxide and Luperox 101 did not work as well as the hydroperoxide but did cure at slightly higher temperatures.

Examples 28-32 in Table 9 demonstrates that acrylate monomer is also curable at low temperature much like styrene. Not all peroxides are equivalent but one skilled in the art would be able to optimize formulations to cure at desired temperature regardless of the monomer used.

TABLE 9

|  | Example 28 | Example 29 | Example 30 | Example 31 | Example 32 |
|---|---|---|---|---|---|
| Resin | Pedigree 600 Acrylate | Pedigree 600 Acrylate | Pedigree 600 Acrylate | Pedigree 600 Acrylate | Pedigree 600 Acrylate |
| Benzopinacol | 1 | 1 | 1 | 1 | 1 |
| Titanocene | 0.5 | 0.5 | 0.5 | 0.5 | 0.5 |
| DICUP | 1 |  |  |  |  |
| Luperox 101 |  | 1 |  |  |  |
| Luperox TBH70X |  |  | 1 |  |  |
| Dicumyl Hydroperoxide |  |  |  | 1 |  |
| TBP Puck* |  |  |  |  | 1 |
| Surface H | Not Cured** | Not Cured*** | Slight sticky | Not Sticky | Not Sticky |
| Hardness |  |  | Hard | Very hard, Cracked | Hard |

*Cured at 80 C. for 1 hr.
**Cured to hard puck in when additionally further kept ~30 min @95 C.
***Cured to hard puck in when additionally further kept 1 hr. @95 C.

The polymerization initiator system may be provided as a two component kit for polymerization reactions. The two component kit includes separate first and second components. According to certain embodiments, the kit comprises a first component comprising a blend or mixture of the pinacol compound and a Group 4 transition metal or Group 4 transition metal-containing compound, and a second component comprising the electron-accepting species or compound that generates a radical that is capable of initiating polymerization. According to other illustrative embodiments, the kit comprises a first component comprising a pinacol and the electron-accepting species or compound that generates a radical that is capable of initiating polymerization, and a second component comprising a Group 4 transition metal or Group 4 transition metal-containing compound The term "kit" therefore encompasses situations where the separately packaged first and second components are both contained within an overpack, or where the separately packaged first and second components are maintained in separate packages and bundled together to form a kit, or where the separately packaged first and second components are maintained in separate packages and simply sold together as a kit of components that are not contained within an overpack container or bundled together.

While the methods of preparation and use have been described in connection with various illustrative embodiments, it is to be understood that other similar embodiments may be used or modifications and additions may be made to the described embodiments for performing the same function disclosed herein without deviating there from. The embodiments described above are not necessarily in the alternative, as various embodiments may be combined to provide the desired characteristics. Therefore, the preparation and methods should not be limited to any single embodiment, but rather construed in breadth and scope in accordance with the recitation of the appended claims.

We claim:

1. A polymerization initiator system comprising (i) a pinacol compound, (ii) a Group 4 transition metal or Group 4 transition metal-containing compound, and (iii) an electron-accepting species capable of being reduced and generating a radical capable of initiating polymerization.

2. The polymerization initiator system of claim 1, wherein (iii) comprises a peroxide or diazo compound.

3. The polymerization initiator system of claim 2, wherein said pinacol compound comprises the following general formula:

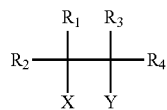

wherein $R_1$ and $R_3$ are the same or different substituted or unsubstituted aromatic groups;
wherein $R_2$ and $R_4$ are the same or different substituted or unsubstituted aliphatic or aromatic groups; and
wherein X and Y are the same or different and comprise hydroxyl, alkoxy, or aryloxy groups.

4. The polymerization initiator system of claim 3, wherein $R_1$-$R_4$ are unsubstituted aromatic groups and both X and Y are hydroxyl groups.

5. The polymerization initiator system of claim 4, wherein said unsubstituted aromatic groups are phenyl groups.

6. The polymerization initiator system of claim 5, wherein said Group 4 transition metal-containing compound is selected from the group consisting of a metal-organic titanium compound and a metal-organic zirconium compound.

7. The polymerization initiator system of claim 6, wherein said Group 4 transition metal-containing compound is a metal-organic titanium compound.

8. The polymerization initiator system of claim 6, wherein said Group 4 transition metal-containing compound is a metal-organic zirconium compound.

9. The polymerization initiator system of claim 7, wherein said metal-organic titanium compound comprises a titanate.

10. The polymerization initiator system of claim 9, wherein said titanate is selected from the group consisting of tetrabutyltitanate, tetra t-butyltitanate, tetraisopropyltitanate, tetra n-propyltitanate, chlorotributyltitanate, dichlorodibutyltitanate, titanium diisopropoxide (bis-2,4-pentanedionate), titanium diisopropoxide bis (ethylacetoacetate), cyclopentadienyltitanium trichloride, titanium tetrachloride, titanium tetrabromide, titanocene dichloride, alkyl substituted titanocene dichloride, alkyl substituted cyclopentadienyl titanium trimethoxide, titanium triisostearoylisopropoxide, titanium tetrakis(bis2,2-(allyloxy-methyl)butoxide, titanium triacrylatemethoxyethoxyethoxide, cresyltitanate, phenyltitanium triisopropoxide, and titanium 3,6-dioxaheptanoate.

11. The polymerization initiator system of claim 8, wherein said metal-organic zirconium compound comprises a zirconate.

12. The polymerization initiator system of claim 11, wherein said zirconate is selected from the group consisting of tetrabutylzirconate, tetraisopropylzirconate, tetra n-propylzirconate, zirconium di-n-butoxide (bis-2,4-pentanedionate), zirconium (tetra-2,4-pentanedionate), zirconium diisopropoxide bis(ethylacetoacetate), cyclopentadienylzirconium trichloride, zirconium tetrachloride, zirconium tetrabromide, zirconocene dichloride, alkyl substituted zirconocene dichloride, and alkyl substituted cyclopentadienyl zirconocene trimethoxide.

13. The polymerization initiator system of claim 2, wherein said peroxide compound is selected from the group consisting of hydroperoxides, peroxyesters, ketone peroxides, diacyl peroxides, peroxydicarbonates, peroxyketal, dialkyl peroxides, cyclic peroxides and mixtures thereof.

14. The polymerization initiator system of claim 13, wherein said hydroperoxides are selected from the group consisting of t-butylhydroperoxide, cumylhydroperoxide, tetramethylbutyl hydroperoxide and mixtures thereof.

15. The polymerization initiator system of claim 13, wherein said peroxyesters are selected from the group consisting of t-butyl peroxyneodecanate, t-butylperoxypivalate, t-butylperoxybenzoate, 2,5-Dimethyl-2,5-di(2-ethylhexanoylperoxy)hexane, t-amyl peroxy-2-ethylhexanoate, and mixtures thereof.

16. The polymerization initiator system of claim 13, wherein said dialkyl peroxides are selected from the group consisting of dicumyl peroxide, 2,5-bis(tert-butylperoxy)-2,5-dimethylhexane and mixtures thereof.

17. The polymerization initiator system of claim 2, wherein said diazo compounds are selected from the group consisting of 2,2'-azodi(isobutyrolnitrile) (AIBN), 2,2'-azodi(2-methylbutyrolnitrile), 1,1'-azodi(hexahydrobenzonitrile) and mixtures thereof.

18. A polymerization initiator system comprising (i) a reaction product of a pinacol compound and a Group 4 transition metal or Group 4 transition metal-containing compound and (ii) an electron-accepting species capable of being reduced and generating a radical capable of initiating polymerization.

19. The polymerization initiator system of claim 18, wherein (ii) comprises a peroxide or diazo compound.

20. The polymerization initiator system of claim 19, wherein said pinacol compound comprises the following general formula:

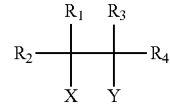

wherein $R_1$ and $R_3$ are the same or different substituted or unsubstituted aromatic groups;
wherein $R_2$ and $R_4$ are the same or different substituted or unsubstituted aliphatic or aromatic groups; and
wherein X and Y are the same or different and comprise hydroxyl, alkoxy, or aryloxy groups.

21. The polymerization initiator system of claim 20, wherein $R_1$-$R_4$ are unsubstituted aromatic groups and both X and Y are hydroxyl groups.

22. The polymerization initiator system of claim 21, wherein said unsubstituted aromatic groups are phenyl groups.

23. The polymerization initiator system of claim 22, wherein said Group 4 transition metal-containing compound is selected from the group consisting of a metal-organic titanium compound and a metal-organic zirconium compound.

24. The polymerization initiator system of claim 23, wherein said Group 4 transition metal-containing compound is a metal-organic titanium compound.

25. The polymerization initiator system of claim 23, wherein said Group 4 transition metal-containing compound is a metal-organic zirconium compound.

26. The polymerization initiator system of claim 24, wherein said metal-organic titanium compound comprises a titanate.

27. The polymerization initiator system of claim 26, wherein said titanate is selected from the group consisting of tetrabutyltitanate, tetra t-butyltitanate, tetraisopropyltitanate, tetra n-propyltitanate, chlorotributyltitanate, dichlorodibutyltitanate, titanium diisopropoxide (bis-2,4-pentanedionate), titanium diisopropoxide bis (ethylacetoacetate), cyclopentadienyltitanium trichloride, titanium tetrachloride, titanium tetrabromide, titanocene dichloride, alkyl substituted titanocene dichloride, alkyl substituted cyclopentadienyl titanium trimethoxide, titanium triisostearoylisopropoxide, titanium tetrakis(bis2,2-(allyloxy-methyl)butoxide, titanium triacrylatemethoxyethoxyethoxide, cresyltitanate, phenyltitanium triisopropoxide, and titanium 3,6-dioxaheptanoate.

28. The polymerization initiator system of claim 25, wherein said metal-organic zirconium compound comprises a zirconate.

29. The polymerization initiator system of claim 28, wherein said zirconate is selected from the group consisting of tetrabutylzirconate, tetraisopropylzirconate, tetra n-propylzirconate, zirconium di-n-butoxide (bis-2,4-pentanedionate), zirconium (tetra-2,4-pentanedionate), zirconium diisopropoxide bis(ethylacetoacetate), cyclopentadienylzirconium trichloride, zirconium tetrachloride, zirconium tetrabromide, zirconocene dichloride, alkyl substituted zirconocene dichloride, and alkyl substituted cyclopentadienyl zirconocene trimethoxide.

30. The polymerization initiator system of claim 19, wherein the reaction product of said pinacol and said Group 4 transition metal-containing compound comprises the following general formula:

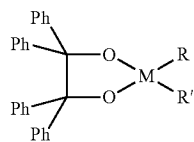

wherein M comprises a metal selected from titanium and zirconium; and
wherein R and R' comprise an organic moiety.

31. The polymerization initiator system of claim 19, wherein the reaction product of said pinacol and said Group 4 transition metal-containing compound comprises the following general formula:

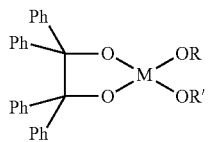

wherein M comprises a metal selected from titanium and zirconium; and
wherein R and R' comprise an organic moiety.

32. The polymerization initiator system of claim 19, wherein said peroxide compound is selected from the group consisting of hydroperoxides, peroxyesters, ketone peroxides, diacyl peroxides, peroxydicarbonates, peroxyketal, dialkyl peroxides, cyclic peroxides and mixtures thereof.

33. The polymerization initiator system of claim 32, wherein said hydroperoxides are selected from the group consisting of t-butylhydroperoxide, cumylhydroperoxide, tetramethylbutyl hydroperoxide and mixtures thereof.

34. The polymerization initiator system of claim 32, wherein said peroxyesters are selected from the group consisting of t-butyl peroxyneodecanate, t-butylperoxypivalate, t-butylperoxybenzoate, 2,5-Dimethyl-2,5-di(2-ethylhexanoylperoxy)hexane, t-amyl peroxy-2-ethylhexanoate, and mixtures thereof.

35. The polymerization initiator system of claim 32, wherein said dialkyl peroxides are selected from the group consisting of dicumyl peroxide, 2,5-bis(tert-butylperoxy)-2,5-dimethylhexane and mixtures thereof.

36. The polymerization initiator system of claim 19, wherein said diazo compounds are selected from the group consisting of 2,2'-azodi(isobutyrolnitrile) (AIBN), 2,2'-azodi(2-methylbutyrolnitrile), 1,1'-azodi(hexahydrobenzonitrile) and mixtures thereof.

37. The polymerization initiator system of claim 19, wherein said polymerization initiator comprises the titanium alkoxide of benzopinacol of the following chemical structure:

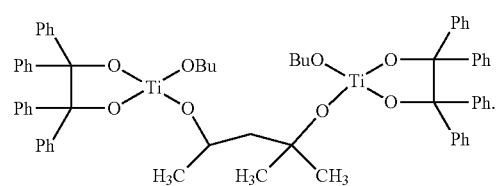

38. The polymerization initiator system of claim 19, wherein said polymerization initiator comprises the zirconium alkoxide of benzopinacol of the following chemical structure:

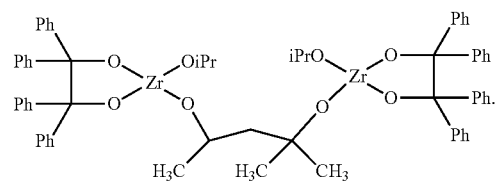

39. A polymerization process comprising:
adding a polymerization initiator composition comprising either (A) a mixture of (i) a pinacol compound, (ii) a Group 4 transition metal or Group 4 transition metal-containing compound, and (iii) an electron-accepting species capable of being reduced, or (B) a mixture of (i) the reaction product of a pinacol compound and a Group 4 transition metal or Group 4 transition metal-containing compound and (ii) an electron-accepting species capable of being reduced by a Group 4 transition metal or Group 4 transition metal-containing compound, to a reactive monomer, or an unsaturated polymer, or a mixture of unsaturated polymer and reactive monomer; and
polymerizing said reactive monomer and/or unsaturated polymer at a temperature of 90° C. or lower.

40. The polymerization process of claim 39 comprising:
adding a Group 4 transition metal or Group 4 transition metal-containing compound to a reactive monomer, or an unsaturated polymer, or a mixture of unsaturated polymer and reactive monomer to prepare a first mixture;
adding a pinacol compound and electron-accepting species to a reactive monomer, or an unsaturated polymer, or a mixture of unsaturated polymer and reactive monomer to prepare a second mixture;
combining said first mixture and said second mixture; and
polymerizing said reactive monomer and/or unsaturated polymer present in said combined first and second mixture at a temperature of 90° C. or lower.

* * * * *